May 17, 1966 R. G. LOCKWOOD ET AL 3,251,809
PRESSURE-SENSITIVE TAPE BACKINGS
Filed Dec. 20, 1962
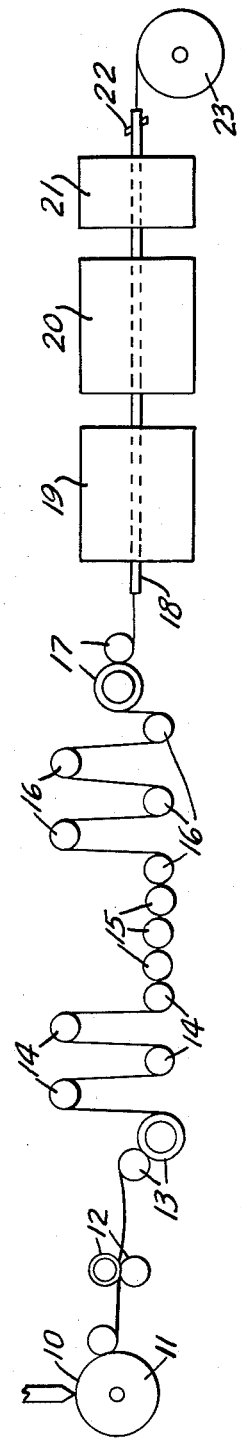
INVENTORS
ROBERT G. LOCKWOOD
COURTLAND L. AGRE
BY Carpenter, Abbott, Coulter & Kinney
ATTORNEYS

United States Patent Office 3,251,809
Patented May 17, 1966

3,251,809
PRESSURE-SENSITIVE TAPE BACKINGS
Robert G. Lockwood, Mendota Heights, and Courtland L. Agre, Minneapolis, Minn., assignors to Minnesota Mining and Manufacturing Company, St. Paul, Minn., a corporation of Delaware
Filed Dec. 20, 1962, Ser. No. 245,977
7 Claims. (Cl. 260—75)

This application is a continuation-in-part of our co-pending application Serial No. 734,524, filed May 12, 1958, and now abandoned.

This invention relates to biaxially tensilized film of non-linear, highly polymeric polyester which provides novel and useful pressure-sensitive adhesive tape constructions.

Transparent pressure-sensitive adhesive tape is a common household item and is also widely used in commerce and industry. For the most part, cellophane is currently employed as the backing for transparent pressure-sensitive adhesive tapes because of its excellent clarity, dispensability and smoothness as well as adequate strength for many holding and packaging applications. This type of tape is normally used with a dispenser having a serrated edge for convenience in severing a desired length.

Cellophane is subject to the well-known disadvantage of becoming brittle and yellow on prolonged aging, particularly when exposed to sunlight or to low humidity. Accordingly, it has been necessary to substitute other materials such as cellulose acetate for cellophane in such uses as mending books. Because each such substitute possesses certain other disadvantages, cellophane continues to be the most widely used backing film in transparent pressure-sensitive adhesive tape. By way of example, conventional oriented polyethylene terephthalate film ("Mylar") is sometimes used as a backing for pressure-sensitive adhesive tape where a high degree of permanence, among other properties, is required. However, it is not easily severable on ordinary dispensers and so lacks the convenience in use required for large-scale commercial success.

The present invention teaches a novel non-linear polymeric polyester which, when extruded as a film and tensilized, provides a transparent backing for pressure-sensitive adhesive tape which is almost indistinguishable from cellophane in appearance and performance. Because it is readily dispensed with a serrated edge, customers have no reason to believe it is not cellophane except that the tensilized non-linear polyester film is highly resistant to degradation upon aging and is believed to be equivalent to the conventional tensilizer, linear polyethylene terephthalate film in this respect. The polyester films employed possess other important advantages, i.e., low moisture absorption, low water vapor and gas permeability, good resistance to dilute acids and bases and to most common organic solvents and are far superior to cellophane in each of these respects. Compared to conventional linear polyethylene terephthalate, the non-linear polyesters have certain advantages besides improved dispensability. For instance, their polymerization as a general rule may be effected in approximately two-thirds to one-half the time. The non-linear polyesters have melting points which are lower and broader in range, permitting lower extrusion and orientation temperatures and less criticality in control of these temperatures in comparison to the production of linear polyesters.

The non-linear polyester films exhibit excellent winding properties in that the film will slide upon itself to allow winding into wrinkle-free rolls. In contrast, contacting surfaces of conventional linear polyethylene terephthalate films tend to stick together. To enable winding linear polyester films into wrinkle-free rolls, it has been necessary to apply a lubricant or incorporate one into the polymer. The lubricant frequently causes opacity and must be removed or a clarifying agent must be added if a film of sufficient clarity is to be obtained. In contrast, the non-linear polyester films used in this invention are noteworthy for their clarity which is achieved without the addition of a clarifying agent.

Thus, the pressure-sensitive adhesive tapes of this invention have certain advantages as compared to cellophane-backed tapes and as to tapes prepared from conventional linear polyester films. These advantages fall in four categories: (1) manufacture of the polyester and the film; (2) manufacture of the pressure-sensitive adhesive tape; (3) merchandisability of the tape rolls; and (4) performance of the tape after application by the consumer.

In the manufacture of films, the process of preparing cellophane is not analogous to the process for preparing tensilized polyester films. However, the non-linear films employed in this invention may be prepared more easily than linear polyethylene terephthalate films because the excellent winding characteristics of the non-linear films make it easier to prepare rolls of the films.

The advantages in the manufacture of the pressure-sensitive adhesive tapes are primarily with respect to cellophane in that the tapes of this invention may be prepared at higher temperatures than cellophane-backed tapes because of the better heat stability of the polyesters. Furthermore, they are less brittle than cellophane and, accordingly, there is less breakage in the manufacturing process. Their resistance to solvents makes possible a broader solvent selection in the application of the pressure-sensitive adhesive coatings. Thus, the use of the non-linear polyester films makes possible a greater latitude in manufacturing techniques as compared to the use of cellophane as a pressure-sensitive adhesive tape backing.

Since the tapes of this invention do not become discolored or brittle with changes in humidity, etc., roll stability is greatly enhanced as compared to cellophane tapes. Thus, the shelf life of the rolls of tape is much improved and this greatly facilitates the merchandisability of the product as compared to cellophane-backed tapes.

The stability of the tapes renders them more useful to the consumer and broadens the general utility of pressure-sensitive adhesive tapes in that known limitations of cellophane-backed tapes are eliminated.

A factor in the susceptibility of a film to being severed on a serrated edge is its tear strength. A convenient test for measuring tear strength is described in ASTM 1004–49T. In this test, a notched sample of defined pattern is pulled apart on the Instron Tensile Tester at a jaw separation rate of one inch per minute. It has been found that film of about 0.001 to 0.0012 inch thickness should have a tear strength in this test of less than about 1900 pounds per inch of thickness in order to be severable by a serrated edge. Preferably the tear strength should be somewhat lower, e.g., in the order of 1600/1700 pounds per inch of thickness, but at tear strengths below about 1400, difficulty may be encountered in handling the film during processing.

Another method for determining tear strength was devised more effectively to simulate hand dispensability on a serrated edge of the type commonly used in hand dispensers. In this test the number of swings required by a rocking arm to cut a sample on the serrated edge is measured, and has been designated the "rocking arm tear test." In this test, a ½ inch wide sample of film or pressure-sensitive adhesive tape is attached at one end to a weight (200 gm. in testing film and 300 gm. in testing tape) and to the rocking arm on the other end. The sample is placed in contact with the serrated edge (in the case of tapes, the adhesive contacts the serrated edge) so that it is bent at a right angle parallel to the rocking arm when in its vertical position. The rocking arm is then placed in motion and the number of swings 20° left of center and back to its vertical position required to sever the tape is determined and reported as the "rocking arm tear test value." Best results are obtained by determining several results for the same sample and using the average "value." It will also be appreciated that the observed values in this test may vary slightly from operator to operator and apparatus to apparatus but in any case the manifold (at least 5) advantages of the non-linear polyester tapes of this invention as compared to linear polyester will consistently be observed.

As a general rule, non-linear polyester film which by itself has a rocking arm tear test value below 500 is required to prepare the tapes of this invention, the preferred range being 50 to 200. The rocking arm tear test values for the pressure-sensitive adhesive tape constructions of this invention are below 200 and are preferably in the range of 10 to 50.

The transparent pressure-sensitive adhesive tapes of this invention are conveniently wound in roll form. They are prepared from extruded and biaxially tensilized film backings of high clarity formed of a non-linear, highly polymeric polyester comprising the condensation product of (1) dicarboxylic acid, 90–100 mole percent of which is terephthalic acid and 10–0 mole percent of which is another dicarboxylic acid, the glycol ester of which is stable at a temperature of 230° C., (2) a glycol and (3) 0.1 to 2.5 mole percent (based on the dicarboxylic starting material, preferably 0.5 to 1.5) of a polyfunctional compound containing at least three reactive groups to provide non-linearity to the polyester and pressure-sensitive adhesive.

If a second dicarboxylic acid is employed, isophthalic acid is particularly preferred since film products produced therewith are of high quality. Also useful is sebacic acid. Mibenzoic acid and naphthalene dicarboxylic acids should also have utility. Less perferred is adipic acid (the glycol ester of which is not thermally stable at temperatures above about 230° C.), since this tends to produce color bodies in polymerization with terephthalic acid and polymethylene glycol, unless care is exercised to keep the temperature of polymerization unduly low for production at commercially acceptable rates.

The glycol is a polymethylene glycol of the formula HO—$(CH_2)_n$—OH wherein $n$ is an integer in the range of 2–10. In the manufacture of the non-linear polyesters, an excess of the glycol is added initially and subsequently recovered by distillation. Thus, the polyester chain will almost always be terminated by the glycol.

Illustrative polyfunctional compounds containing several functional groups capable of producing a non-linear polyester are alcohols such as pentaerythritol, glycerine, trimethylol propane, trimethylol ethane and trimethylol benzene; carboxylic acids, such as pyro-mellitic acid, trimesic acid and esters thereof, isocyanates and amines containing more than two isocyanate and amine groups and compounds containing combinations of such functional groups as well as compounds containing, in addition to two or more of the above types of reactive functional groups, a polymerizable ethylenic group, especially compounds containing an allyl group and compounds containing ethylenic groups which are as readily polymerizable as an allyl-containing compound. It will be appreciated that a tetra-functional compound is theoretically twice as effective as a tri-functional compound in producing crosslinks to provide non-linearity in the polyester since 2 of the 3 or 4 functional groups enter into the linear chain of the polyester.

The pressure-sensitive adhesive tapes of this invention may be produced according to known and proven methods utilizing known aggressively tacky pressure-sensitive adhesives and primers and/or low adhesion backsizes. U.S. Patents Nos. Re. 23,843, 2,319,959, 2,410,079, 2,532,011, 2,567,671, 2,607,711, 2,725,981, 2,876,894, 2,884,126 and 2,889,038 describe and claim numerous types of these compositions.

A better understanding of the invention may be gained by reference to the drawing, the single figure of which is a schematic view in elevation of apparatus for sequentially extruding, tensilizing and heat-setting the novel polymeric polyester in a continuous operation.

Referring in detail to the drawing, molten polyester film 10 is extruded, preferably with beaded edges, upon a rotating quenching drum 11 and drawn therefrom at constant speed by means of driven nip rolls 12 and 13 and driven feed rolls 14 into a series of idler guide rolls 15. Hot water recirculated (means not shown) through idler rolls 15 maintains their surfaces at a constant temperature of about 80–90° C. to heat the film above its second order transition temperature. Cold water passing through the first of five driven pull rolls 16 quenches the film to ambient temperatures. The rolls 16 are driven at a constant speed, e.g., three times the speed of feed rolls 14, whereby the film is tensilized in the longitudinal direction. Nip rolls 17, through which the film 10 is then drawn, are driven at the same circumferential speed as output rolls 16 and serve to eliminate slippage. Care should be taken to keep the nip rolls 17 as well as nip rolls 12 and 13 free from foreign matter which may mar the film. To avoid this difficulty, it is preferred to engage the nip rolls only when necessary to keep the output speed constant.

The rolls 14, 15 and 16 are each about 4.5 inches in outside diameter and are provided, as are the smaller of nip rolls 12, 13 and 17, with a polished chrome finish. The larger of each pair of nip rollers has a rubber sleeve ¾ inch in thickness. Each of idler rolls 15 is separated from adjacent idler and driven rolls, including the last of the feed rolls 14 and the first of the pull rolls 16, by about 0.04 inch. The apparatus is preferably constructed so that those rolls which contact the upper side of the film are movable upwardly with respect to alternate rolls for convenience in loading film.

The film 10 is next directed into the clips of a tenter 18 which carries the film into a first air-circulating oven 19, which is about 20 feet in length and is maintained at a temperature of about 90° C. The track of the tenter 18 is adjusted to diverge the film after it enters the oven to effect crosswise stretching to a desired extent, e.g., three times its original dimension. The film is then carried into a second air-circulating oven 20 which is maintained at about 205° C. to heat-set the film. Typically, the film may be driven at an output speed of 50 feet per minute. Since the oven 20 is only about 10 feet in length, the film 10 actually attains a maximum temperature of somewhat less than 200° C.

After heat-setting, the film 10 is cooled to room temperature before removal from the tenter 18. While cooling may be accomplished simply by short exposure to air, forced cooling is more economical of equipment. Accordingly, cool air is blown against the film as it passes through a dust-free compartment 21, which may include means (not shown) for continuously recirculating, cooling and washing the air. The tenter tracks are adjusted to converge about 0.1 inch during cooling to compensate for shrinkage of the film and to maintain tension in the film at about the same level as in the heat-setting oven 20. The edges of the film 10 which have been marred by the tenter clips are slit away by knives 22, and the film is wound into a roll 23 for storage.

Our invention will now be illustrated by giving a few illustrative examples thereof.

EXAMPLE I

The following ingredients were charged into a stainless steel autoclave equipped with an agitator which almost scrapes the walls of the vessel:

| | |
|---|---|
| Dimethyl terephthalate _____lbs__ | 45 |
| Dimethyl isophthalate _____do__ | 5 |
| Ethylene glycol _____do__ | 39 |
| 1,1,1-trimethylol propane _____grams__ | 157 |
| Manganese acetate tetrahydrate _____do__ | 22.7 |

The trimethylol propane was present in the amount of one mol percent of the total dicarboxylic acid component (dimethyl terephthalate plus dimethyl isophthalate). Heat was applied with continual stirring. At 125° C., the mixture formed a clear solution, and at 150° C., methanol began to distill. The temperature was increased to 220° C. over a period of 1¾ to 2 hours until methanol was no longer distilled. The temperature was then raised over a period of about ½ hour to 265° C. to distill out excess ethylene glycol. The autoclave was then evacuated gradually over a period of about ½ hour until the pressure was reduced to 1 mm. of mercury or lower, with continued distillation of ethylene glycol, and agitation was continued for an additional period of ½ to ¾ hour. During this time, the heaters were shut off since the heat generated from the mechanical work input of the agitator was sufficient to maintain the temperature at about 275°–285° C. The vacuum was broken by the introduction of dry nitrogen gas, and a molten, transparent, pale honey-colored polymeric ester was ejected at a nitrogen pressure of about 10 pounds per square inch into stainless steel trays. The product polyester had an intrinsic viscosity of about 0.7. It should be noted that upon attaining an intrinsic viscosity of about 0.3–0.4, the novel polyesters are capable of forming filaments which can be cold drawn.

Care should be taken that prior to the polymerization stage of the reaction essentially all methanol or other monohydroxy compound be removed, it having been found that the desired intrinsic viscosity may otherwise not be attained or, even if attained, resultant films often have no utility in the practice of the invention.

Film extruded from this polyester was tensilized on apparatus similar to that illustrated in the drawing by first stretching it to about 3.0 times its original dimension in each direction, resulting in a film about 0.0012 inch in thickness. One-inch wide samples of the tensilized film were tested on a Scott Tensile Tester at an initial jaw separation of one inch and relative jaw movement of one inch per minute. The average ultimate tensile strength in the lengthwise direction was 15,300 pounds per square inch at an elongation of 70 percent. Tear strength in the crosswise direction in accordance with ASTM 1004–49T was 1880 pounds per inch of thickness.

By way of comparison, a condensation product consisting of 90 percent polyethylene terephthalate and 10 percent polyethylene isophthalate normally has a tear strength in excess of 2200 pounds, if tensilized to the same extent as the film of this example.

Tensilized polyester film of this example was coated, after first being provided with an adhesion-promoting primer, with a pressure-sensitive adhesive composition which had been prepared as follows: 100 parts by weight of pure latex crepe rubber were milled for 20 minutes, with 1 part of 2,5-di-tert-amyl hydroquinone as antioxidant, on a rubber mill at a temperature of about 65° C. After 75 parts of pure thermoplastic polyterpene resin, having a low acid number and melting at about 115° C., were dissolved in 600 parts of heptane and 10 parts of ethanol by mixing in a churn at room temperature, the milled rubber mixture was added piecewise to the churn during continued mixing. After churning for about 30 hours, the solution was coated over the primer layer of the polyester film, followed by heating to drive off volatiles, leaving a pressure-sensitive adhesive coating of about 5–6 grains per 24 square inches. The dried, coated product was slit and wound into roll-form for convenient storage. The adhesion-promoting primer consisted essentially of a mixture of about 40 parts by weight of a copolymer of butadiene and styrene in a 75:75 ratio and about 58 parts of a water soluble phenolic resin.

Although this pressure-sensitive adhesive tape is readily severed on a small hand dispenser and so is satisfactory for home use, it is somewhat tougher than is preferred for commercial use. For example, a sales clerk may draw a long strip of tape from a stationary dispenser while holding it at the free end and try to tear it at a very shallow angle across the serrated edge. If the clerk is accustomed to dispensing pressure-sensitive cellophane in this manner, the slightest increase in tear strength over cellophane results in complaints, and even cellophane is sometimes criticized for being too tear resistant. Since cellophane has a tear strength of about 1750 pounds per inch of thickness, any substitute therefor is preferably not of greater toughness.

The crosswise tear strength may be reduced by tensilizing the film to a lesser extent in the longitudinal direction, but less tensilization normally results in greater elongation.

EXAMPLE II

A polyester was produced following the same procedure and with the same composition as described in Example I except that 140 grams (one mol percent based on total dicarboxylic acid component) of 1,1,1-trimethylol ethane was used in place of the trimethylol propane.

Film extruded from the polymer was tensilized by stretching to 3.3 times the original length and 3.14 times the original width to provide a tensilized film 0.00073 inch in thickness, somewhat thin for use in pressure-sensitive adhesive tape. When tested as was the film in Example 1, the tensilized film showed an ultimate tensile strength in the lengthwise direction of 20,600 pounds per square inch at an elongation of 53 percent and a crosswise tear strength of 1530 pounds per inch of thickness.

EXAMPLE III

The procedure of Example I was followed except that 108 grams (1.0 mol percent based on total dicarboxylic acid component) of glycerol was used in place of the trimethylol propane. The total vacuum time was 1¼ hours at a maximum temperature of 292° C. and a maximum vacuum of 0.8 mm. The polymeric product had an intrinsic viscosity of 0.71. Although the difference was small, the rate of polymerization using glycerol was slower than in using trimethylol propane.

Film extruded from this polymer and tensilized by stretching to 2.9 times its original length and width produced a film about 0.00087 inch in thickness. When tested as described in Example I, the film showed an ultimate tensile strength of 23,400 pounds per square inch and a break elongation of 70 percent. Its tear strength in the crosswise direction was 1800 pounds per inch of thickness.

EXAMPLE IV

This example concerns a polyester essentially identical to that of Example I except that the ratio of terephthalic acid to isophthalic acid was 85:15 instead of 90:10. Film of this polyester was tensilized by being stretched to 3.0 times its original length and then to 3.38 times its original width. Its thickness was then 0.00088 inch. Following the procedure of Example I, its longitudinal ultimate tensile strength was 13,300 pounds per square inch at elongation of 65 percent, and its crosswise tear strength was 1570 pounds per inch of thickness.

Comparable polyester film, except for the omission of the tri-alcohol, has somewhat lower tear strength than does tensilized unmodified polyethylene terephthalate but is still too tough to be useful for dispensing from a serrated edge. Satisfactory tear values in the ASTM 1004–49T test may be attained without the tri-alcohol or other polyhydric additive at greatly reduced proportions of terephthalic acid, but such polyester films have too high elongation for convenient dispensing.

EXAMPLE V

To one side of tensilized polyester film, essentially identical to that described in Example I, was applied by vapor deposition in a high vacuum a coating of aluminum of thickness just sufficient to provide an opaque and highly reflective coating when viewed through the transparent polyester film. A layer of pressure-sensitive adhesive was then applied over the aluminum layer and the whole was adhered by means of the adhesive layer to an aluminum panel. Thin layers of enamel, some containing opaque black organic pigment and others containing transparent red or gold organic pigment, were then applied in strips to the exposed surface of the polyester film, leaving some areas plain. Over the whole exposed surface was then applied a soybean oil-modified alkyd resin.

The aluminum coating showed through the polyester film with perfect clarity in the non-pigmented areas and the red and gold areas were exceedingly bright and showed true color. The low tear strength of the novel polyester is, if anything, an advantage since it is important that protective coatings, advertising signs, identification markings and the like utilizing this construction be vandal-proof, i.e., not susceptible to being peeled away in sizeable sections.

EXAMPLE VI

Using the method of Example I, dimethyl terephthalate (8.0 moles) was charged to a 1 gal. stainless steel kettle together with ethylene glycol (17.6 moles) and pentaerythritol (0.06 mole, 8.16 g.) and manganese acetate tetrahydrate catalyst, whereby a non-linear polyester was prepared in a condensation period of 14 minutes at 280° C. and 2.5 to 0.6 mm. of Hg after a 70-minute alcoholysis at from 150 to 225° C. A parallel condensation, without the addition of pentaerythritol, would take about 60 minutes. The resulting non-linear polyester had an intrinsic viscosity of 0.62 and constituted a suitable non-linear polyester for biaxial tensilization and the preparation of pressure-sensitive adhesive tapes of excellent dispensability.

EXAMPLE VII

Using the method of Example I, dimethyl terephthalate (8.0 moles) was charged to a 1 gal. stainless steel kettle together with ethylene glycol (17.6 moles) and tetramethyl pyromellitate (0.06 mole, 18.6 g.) and manganese acetate tetrahydrate catalyst, whereby a non-linear polyester was prepared in a condensation period of 11 minutes at 280° C. and 2.2 to 0.8 mm. after a 70-minute alcoholysis at 150 to 230° C. The resulting non-linear polyester had an intrinsic viscosity of 0.57 and constituted a suitable non-linear polyester for biaxial tensilization and the preparation of pressure-sensitive adhesive tapes of excellent dispensability.

EXAMPLE VIII

A 1 gal. stainless steel kettle was charged with ethylene glycol (100 ml.), bis(2-hydroxyethyl)terephthalate (6 moles), manganese acetate tetrahydrate (1.16 gm.) and

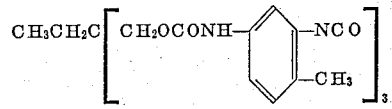

(0.06 mole). The reactants were heated for one hour at 250° C. during which time glycol (175 ml.) distilled from the kettle. Agitation of the batch was continued at 1.5–0.6 mm. and 280° C. for 11 minutes to form a very rubbery and amber resin which was poured into a stainless steel tray to crystallize. It was then granulated, pressed into film, and biaxially stretched. The resulting film had an average rocking arm tear value of 346.

EXAMPLE IX

A 1 gal. stainless steel kettle was charged with dimethyl terephthalate (7.84 moles), ethylene glycol (17.6 moles),

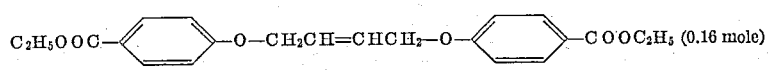

manganese acetate tetrahydrate (1.5 gm.) and Sb$_2$O$_3$ (0.45 gm.). Glycolysis was conducted and methanol was distilled off over a period of about 75 minutes at a temperature of 160–220° C. Excess glycol was collected while the temperature was raised to 250° C. over a period of about 20 minutes. The pressure in the kettle was gradually reduced to 1.5 mm. of Hg over a period of about 30 minutes during which time the temperature was 250–280° C. The reaction was continued at 280° C. for 12 minutes. The resulting non-linear polyester was very viscous and amber in color and crystallized upon cooling. Its melting point was 255–260° C. Films were prepared as in Example VIII and had an average rocker arm tear value of 22.

EXAMPLE X

Using the procedure of Example I, non-linear polyesters were prepared from terephthalic acid, ethylene glycol and trimethylol propane (TMP) in the proportions (mole percent of the terephthalic acid component) indicated in Table 1. Biaxially tensilized films and tapes were prepared and tested as indicated.

*Table 1*

| Mole Percent TMP | Lengthwise Tensilization | Film Caliper | Rocker Arm Tear Value Ranges | |
|---|---|---|---|---|
| | | | Film | Tape |
| 0.5 | 2:1 | 1.13–1.3 | 269–500+ | 68–143 |
| 0.7 | 3:1 | 1.2–1.35 | 174–500+ | 44–60 |
| 0.75 | 2.6:1 | 1.13–1.2 | 22–322 | 4–15 |
| 0.9 | 2.0:1 | 1.03–1.5 | 42–409 | 14–58 |
| 0.95 | 1.2:1 | 1.11–1.23 | 150–315 | 17–90 |
| 1.0 | 1.5:1 | 1.20–1.30 | 58–317 | 16–33 |
| 1.05 | 3:1 | 1.5–1.55 | 156–451 | 8–33 |
| 1.10 | 3.2:1 | 1.17–1.29 | 13–85 | 8–16 |
| 1.25 | 3.5:1 | 1.0–1.15 | 9–17 | 3–24 |

EXAMPLE XI

Using the procedure of Example I, non-linear polyesters were prepared from charges containing dimethyl terephthalate (4540 gms.), ethylene glycol (3405 gms.) and polyfunctional alcohols or carboxylic acids as indicated below in Table 2 and biaxially tensilized films therefrom tested for rocking arm tear values.

Table 2

| Polyfunctional Compound No. | Grams | Resin Intrinsic Viscosity | Tensile Strength* (Pounds per square inch) | Lengthwise Elongation at Break* (Percent) | Caliper | Film Average Rocking Arm Tear Value |
|---|---|---|---|---|---|---|
| 1 | 62.8 | 0.65 | 20,100 | 79 | 0.9–1.2 | 76 |
| 2 | 92 | 0.68 | 13,500 | 65 | 1.0–1.5 | 402 |
|   | 64.5 | 0.68 | 17,000 | 94 | 1.0–1.5 | 348 |
| 3 | 84.3 | 0.71 | 20,200 | 130 | 1.1–1.5 | 346 |
| 4 | 59 | 0.70 | 21,800 | 123 | 1.1–1.4 | 500 |
|   | 118 | 0.71 | 22,000 | 102 | 1.0–1.4 | 450 |
|   | 177 | 0.74 | 13,700 | 25 | 0.7–1.3 | 9 |
| 5 | 23.5 | 0.78 | 19,000 | 88 | 1.1–1.4 | 414 |
| 6 | 27.15 | 0.67 | 27,300 | 115 | 1.3–1.6 | 500 |
|   | 54.3 | 0.67 | 22,000 | 90 | 0.9–1.3 | 158 |

1. Trimethylol propane.
2. Glycerol.
3. Trimethylol ethane.
4. Trimethyl trimesate.
5. Pentaerythritol.
6. Tetramethyl pyromellitate.

*One inch wide samples measured on an Instron Tensile tester with an initial jaw separation of 2 inches and a relative jaw separation of 5 inches per minute.

In general, it is preferable to add the polyfunctional compound at the start of the preparation of the linear polyester but it could be put in towards the end of the reaction.

We claim:

1. Biaxially tensilized film of non-linear, highly polymeric polyester which comprises the condensation product of
   (1) dicarboxylic acid, 90 to 100 mole percent of which is terephthalic acid and 10 to 0 mole percent of which is another dicarboxylic acid, the glycol ester of which is stable at a temperature of 230° C.,
   (2) polymethylene glycol of the formula $$HO—(CH_2)_n—OH$$

wherein $n$ is an integer of 2–10, said glycol being employed in excess of that necessary to completely esterify said dicarboxylic acid, and
   (3) a polyfunctional compound in the amount of 0.1 to 2.5 mole percent based on the dicarboxylic acid component and selected from the group consisting of alcohols, carboxylic acids, esters or carboxylic acids, isocyanates and amines, containing at least three groups reactive with the carboxyl and hydroxyl groups of said dicarboxylic acid and polymethylene glycol, which film when provided with a pressure-sensitive adhesive coating may be readily dispensed in desired lengths by tearing against a serrated edge.

2. Biaxially tensilized film of non-linear, highly polymeric polyester which comprises the condensation product of
   (1) dicarboxylic acid, 90 to 100 mole percent of which is terephthalic acid and 10 to 0 mole percent of which is another dicarboxylic acid, the glycol ester of which is stable at a temperature of 230° C.,
   (2) polymethylene glycol of the formula $$HO—(CH_2)_n—OH$$

wherein $n$ is an integer of 2–10, said glycol being employed in excess of that necessary to completely esterify said dicarboxylic acid, and
   (3) a polyfunctional alcohol containing at least three hydroxyl groups to provide non-linearity to the polyester and in the amount of 0.1 to 2.5 mole percent based on the dicarboxylic acid component, which film when provided with a pressure-sensitive adhesive coating may be readily dispensed in desired lengths by tearing against a serrated edge.

3. Biaxially tensilized film of non-linear, highly polymeric polyester which comprises the condensation product of
   (1) terephthalic acid,
   (2) polymethylene glycol of the formula $$HO—(CH_2)_n—OH$$

wherein $n$ is an integer of 2–10, said glycol being employed in excess of that necessary to completely esterify said terephthalic acid, and
   (3) a tri-hydric alcohol in the amount of 0.1 to 2.5 mole percent based on the dicarboxylic acid component, which film when provided with a pressure-sensitive adhesive coating may be readily dispensed in desired lengths by tearing against a serrated edge.

4. The tensilized film of claim 3 wherein the tri-hydric alcohol of the polyester is trimethylolpropane.

5. The tensilized film of claim 3 wherein the tri-hydric alcohol is glycerine.

6. Biaxially tensilized film of non-linear, highly polymeric polyester which comprises the condensation product of
   (1) dicarboxylic acid, 90 to 100 mole percent of which is terephthalic acid and 10 to 0 mole percent of which is another dicarboxylic acid, the glycol ester of which is stable at a temperature of 230° C.,
   (2) polymethylene glycol of the formula $$HO—(CH_2)_n—OH$$

wherein $n$ is an integer of 2–10, said glycol being employed in excess of that necessary to completely esterify said dicarboxylic acid, and
   (3) a polyfunctional carboxylic acid containing at least three carboxyl groups and in the amount of 0.1 to 2.5 mole percent based on the dicarboxylic acid component, which film when provided with a pressure-sensitive adhesive coating may be readily dispensed in desired lengths by tearing against a serrated edge.

7. The tensilized film of claim 6 wherein the polyfunctional carboxylic acid is trimesic acid.

References Cited by the Examiner

UNITED STATES PATENTS

| | | | |
|---|---|---|---|
| 2,647,843 | 8/1953 | Bemmels | 117—122 |
| 2,703,772 | 3/1955 | Keithly | 161—215 |
| 2,740,732 | 4/1956 | Peck et al. | 117—107 |
| 2,744,078 | 5/1956 | Caldwell | 260—75 |
| 2,786,778 | 3/1957 | Palmquist | 117—122 |
| 2,878,142 | 3/1959 | Bohaty | 117—76 |
| 2,889,304 | 6/1959 | Scheffer et al. | |
| 2,925,174 | 2/1960 | Stow | 117—122 |
| 2,985,609 | 5/1961 | Plitt | 117—122 |
| 2,996,410 | 8/1961 | Hnilicka | 117—107.1 |
| 3,043,806 | 7/1962 | Caldwell | 260—75 |

WILLIAM D. MARTIN, *Primary Examiner.*

RICHARD D. NEVIUS, *Examiner.*